US012135119B1

(12) United States Patent
Sinitsky et al.

(10) Patent No.: US 12,135,119 B1
(45) Date of Patent: Nov. 5, 2024

(54) FRAME ASSEMBLY

(71) Applicant: AMERLUX LLC, Oakland, NJ (US)

(72) Inventors: Olga Sinitsky, Nutley, NJ (US); Ronald Sola, Haledon, NJ (US)

(73) Assignee: AMERLUX, LLC, Oakland, NJ (US)

(*) Notice: Subject to any disclaimer, the term of this patent is extended or adjusted under 35 U.S.C. 154(b) by 0 days.

(21) Appl. No.: 18/588,566

(22) Filed: Feb. 27, 2024

(51) Int. Cl.
*F21V 21/04* (2006.01)
*F21S 8/02* (2006.01)

(52) U.S. Cl.
CPC .............. *F21V 21/04* (2013.01); *F21S 8/026* (2013.01); *F21V 21/047* (2013.01)

(58) Field of Classification Search
CPC ......... F21V 21/04; F21V 21/047; F21S 8/026
USPC .................................................. 362/147, 365
See application file for complete search history.

(56) References Cited

U.S. PATENT DOCUMENTS

| | | | | |
|---|---|---|---|---|
| 8,511,867 | B1 * | 8/2013 | Tam | F21S 8/026 362/147 |
| 10,125,958 | B1 * | 11/2018 | Wronski | F21V 21/047 |
| 10,247,371 | B2 * | 4/2019 | Feldman | F21V 17/162 |
| 10,627,084 | B1 | 4/2020 | Wronski et al. | |
| 2004/0177572 | A1 * | 9/2004 | Burgess | F21V 21/04 52/220.8 |
| 2015/0241038 | A1 * | 8/2015 | Fryzek | F21S 8/026 362/147 |
| 2022/0154921 | A1 * | 5/2022 | Portinga | F21S 8/026 |

* cited by examiner

*Primary Examiner* — Laura K Tso
(74) *Attorney, Agent, or Firm* — DAY PITNEY LLP; George N. Chaclas; Anthony A. Kassas

(57) ABSTRACT

A frame assembly for a recessed luminaire. The frame assembly has a planar platform with a sheetrock side and an exposed side opposing the sheet rock side. The planar platform defines a central aperture for receiving the recessed luminaire, and a plurality of perforations disposed around the central aperture, the perforations configured for receiving construction compound. The frame assembly has at least two barbs configured for bending out of a plane of the platform for insertion into sheetrock. Each barb has a barb base extending away from the exposed side of the planar platform at a 45 degree angle. Each barb has a barbed shank region extending towards the sheet rock side at a 90 degree angle with respect to the barb base so that the barbed shank region is configured to be secured into sheetrock when the sheetrock side of the platform is against sheetrock.

18 Claims, 9 Drawing Sheets

FRAME ASSEMBLY

FIELD OF THE DISCLOSURE

The subject disclosure relates to lighting devices, and more particularly to a lighting devices intended for fixed installation of recess-mounted type, such as downlighters intended to be recessed in a ceiling or overhead structure.

BACKGROUND

A recessed luminaire incorporates various technical components for effective functionality and seamless ceiling integration. The luminaire typically consists of a housing, which encases components like the LED light source, reflector or optic system, and driver. The LED module emits light, and the reflector or optic system shapes and directs the light output according to the desired illumination pattern. The driver regulates the electrical current to ensure optimal performance.

Installation involves creating an opening in the ceiling to accommodate the housing, with the luminaire secured in place using mounting brackets or other attachment mechanisms. The trim or bezel is then added for a finished look, concealing the luminaire's edges and contributing to its aesthetic integration with the ceiling. Plaster frames have gained prominence as a preferred choice for integrating lighting fixtures into architectural elements. The use of plaster frames offers a seamless and cohesive appearance by blending the luminaire with the surrounding surfaces.

However, the conventional installation process often poses challenges for contractors. The existing methods commonly involve intricate procedures that demand a precise understanding of the ceiling thickness, necessitating the use of specific screw sizes and complicated mounting arrangements to secure the downlights to above structures. This process not only adds complexity to the installation but also limits the adaptability of the downlights to different ceiling configurations. The need for meticulous measurements and the reliance on screw-based mounting systems have been issues in the realm of recessed lighting solutions, hindering the efficiency and versatility of these fixtures.

SUMMARY

An embodiment of the subject technology includes a frame assembly for a recessed luminaire. The frame assembly comprises a planar platform having a sheetrock side and an exposed side opposing the sheet rock side. The planar platform defines a central aperture and a plurality of perforations disposed around the central aperture, the perforations configured for receipt of construction compound. The frame assembly includes an aperture collar configured for disposal within the central aperture of planar platform, the aperture collar configured to connect to the recessed luminaire. The frame assembly includes at least two barbs configured for bending out of a plane of the platform for insertion into sheetrock, each barb having: a barb base extending away from the exposed side of the planar platform at an angle of approximately 45 degrees, and a barbed shank region extending towards the sheet rock side at an angle of approximately 90 degrees with respect to the barb base so that the barbed shank region is configured to be secured into sheetrock when the sheetrock side of the platform is against sheetrock.

In other embodiments, the aperture collar may include a radial lip configured for encircling the central aperture, the radial lip stepping down to an interior radial boss, the radial lip and interior radial boss serving as a snap connection point for the recessed luminaire. The aperture collar may further include an axial tubing for insertion into sheetrock housing the recessed luminaire. The aperture collar may further include a podium disposed radially outward from the axial tubing, the podium configured to receive a pin extending from the exposed side to the sheetrock side of the platform, affixing the radial lip, interior radial boss, and axial tubing to the platform.

The platform may further define at least two oblong slots disposed around the central aperture, each oblong slot extending between a distal edge and a proximate edge, the at least two barbs connected to the proximate edge of a respective oblong slot. Each barb may further include anchor flanges configured to bend the barb base away from the exposed side of the planar platform at the 45 degree angle, and an intermediate barb region that the displaces barb base from the barbed shank region by the 90 degrees. Each barb may define a pair of proximate outwardly jutting teeth, a pair of distal outwardly jutting teeth, and terminating at a point.

An embodiment of the subject technology includes frame assembly a frame assembly for a recessed luminaire comprising a planar platform. The planar platform includes a sheetrock side, an exposed side opposing the sheet rock side, an aperture collar defining a central aperture, and at least two integrated bent barbs. Each integrated barb has a barb base extending away from the exposed side at an angle of approximately 45 degrees with respect to the planar platform, and a barbed shank region extending from a bend back towards the sheet rock side at an angle of approximately 90 degrees with respect to the barb base so that the barbed shank region is configured to be secured into sheetrock when the sheetrock side is against sheetrock of the platform. The aperture collar extends into a hole in the sheetrock, and the integrated barb is struck with a hammer. The planar platform defines a plurality of perforations disposed around the central aperture and an oblong slot around each integrated barb, the perforations and oblong slot being configured to receive construction compound that cements the planar platform against the sheetrock with the at least two integrated barbs.

In other embodiments, the aperture collar may include a radial lip configured for encircling the central aperture, the radial lip stepping down to an interior radial boss, the radial lip and interior radial boss serving as a connection point for the recessed luminaire. The aperture collar may further include an axial tubing for insertion into sheetrock housing the recessed luminaire. Yet still, the aperture collar may further include a podium disposed radially outward from the axial tubing, the podium configured to receive a pin extending from the exposed side to the sheetrock side of the platform, affixing the radial lip, interior radial boss, and axial tubing to the platform.

The platform may further define at least two oblong slots disposed around the central aperture, each oblong slot extending between a distal edge and a proximate edge, the at least two integrated barbs connected to the proximate edge of a respective oblong slot. Each integrated barb may further include anchor flanges configured to bend the barb base away from the exposed side of the planar platform at the 45 degree angle, and an intermediate barb region that displaces the barb base from the barbed shank region by the 90 degrees. Each integrated barb may further define a pair of proximate outwardly jutting teeth, a pair of distal outwardly jutting teeth, and terminating at a point.

An embodiment of the subject technology includes a frame assembly for a recessed luminaire comprising a planar platform having a sheetrock side and an exposed side opposing the sheet rock side. The planar platform defines a central aperture configured for receiving the recessed luminaire, and a plurality of perforations disposed around the central aperture, the perforations configured for receipt of construction compound. The frame assembly further includes at least two barbs configured for bending out of a plane of the platform for insertion into sheetrock. Each barb has a barb base extending away from the exposed side of the planar platform at an angle of approximately 45 degrees, and a barbed shank region extending towards the sheet rock side at an angle of approximately 90 degrees with respect to the barb base so that the barbed shank region is configured to be secured into sheetrock when the sheetrock side of the platform is against sheetrock.

In other embodiments, the platform may further define at least two oblong slots disposed around the central aperture, each oblong slot extending between a distal edge and a proximate edge, the at least two barbs connected to the proximate edge of a respective oblong slot. Each barb may further include anchor flanges configured to bend the barb base away from the exposed side of the planar platform at the 45 degree angle, and an intermediate barb region that displaces the barb base from the barbed shank region by the 90 degrees. Each barb may define a pair of proximate outwardly jutting teeth, a pair of distal outwardly jutting teeth, and terminating at a point.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
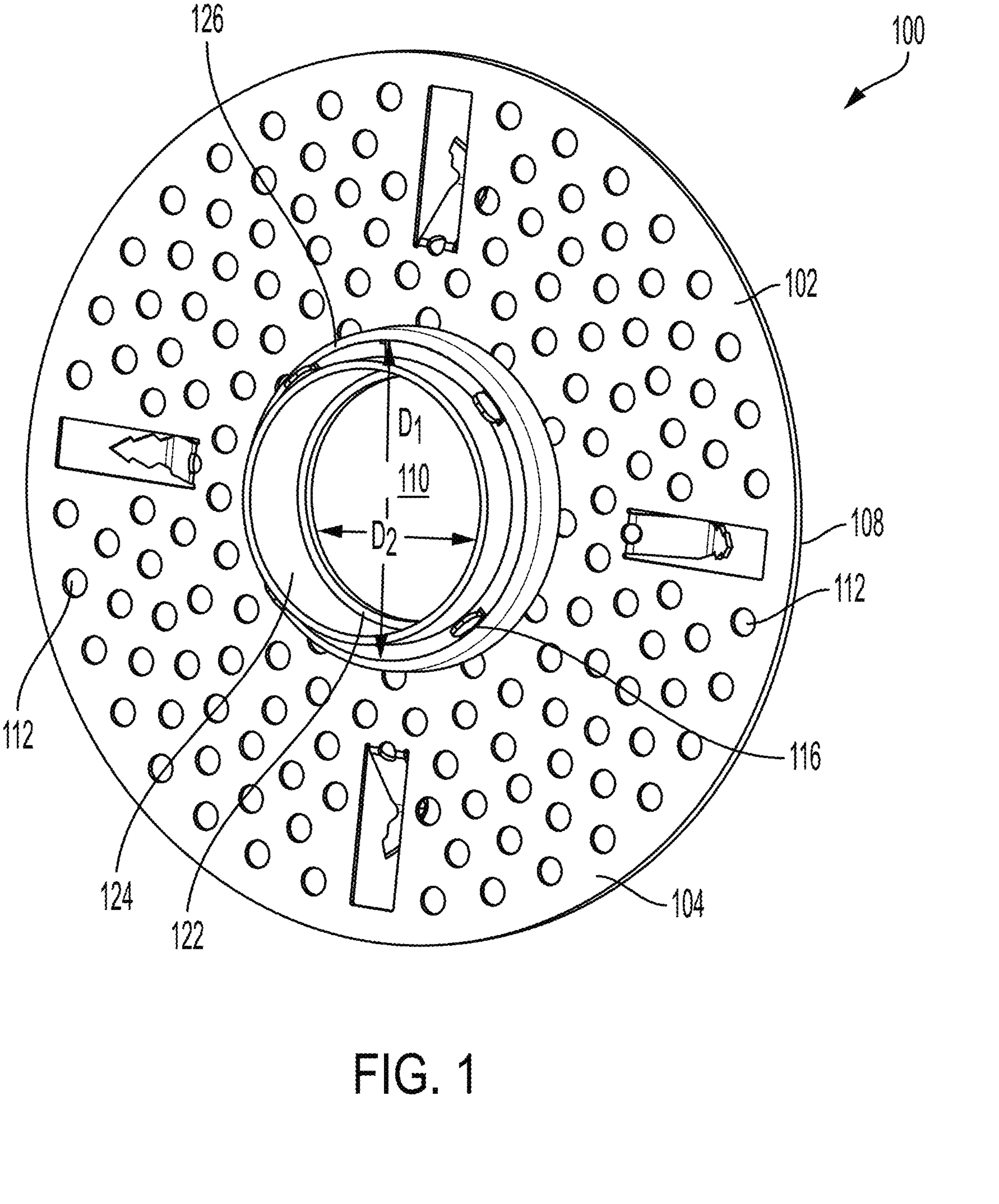
FIG. 1 is a perspective view of a sheetrock side of a frame assembly for a recessed luminaire, according to the subject technology.

The subject technology overcomes many of the prior art problems associated with frames for recessed luminaires. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
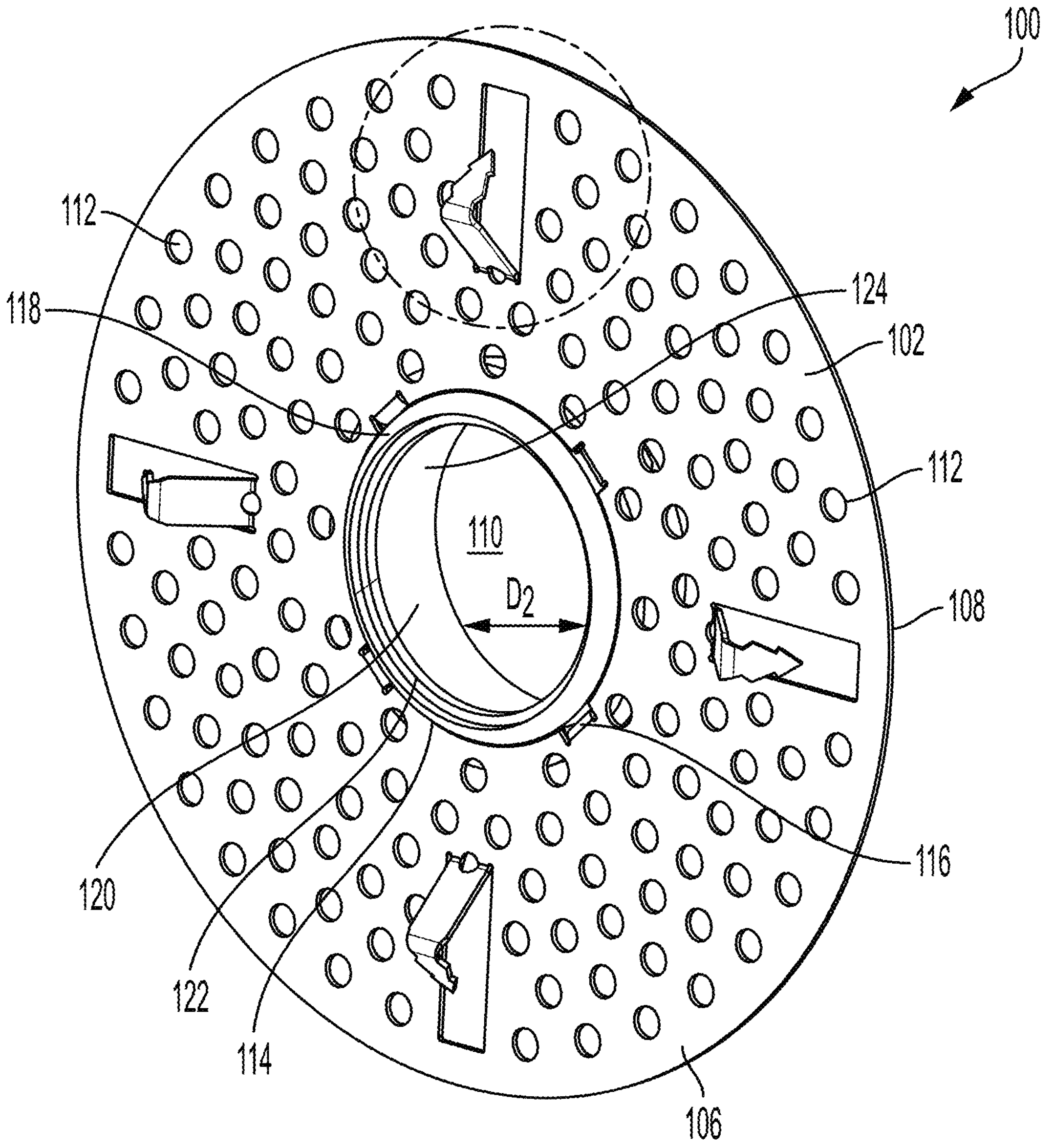
FIG. 2 is a perspective view of an exposed side of the frame assembly.

Referring now to FIGS. 1 and 2, perspective views of a frame assembly 100 for a recessed luminaire are shown. The frame assembly 100 is defined by a platform 102 which, in some embodiments, is generally planar in profile. The platform 102 is defined by a disc shape, having a round, wafer-like thinness and curvature. However, one have ordinary skill in the art will appreciate that the profile and shape of the platform 102 can vary from application to application.

From the vantage point of FIG. 1, the platform 102 defines a sheetrock side 104, while the perspective of FIG. 2 shows an exposed side 106, opposing the sheetrock side 104. The sheetrock side 104 and exposed side 106 mirror each other in shape and profile, and conjoin at a platform perimeter 108, the perimeter 108 serving as an edge transition therebetween.

The platform 102 has a central aperture 110 and a plurality of perforations 112, the central aperture 110 and plurality of perforations 112 all extending between the sheetrock side 104 and the exposed side 106. The perforations 112 are circular in shape and numerous in quantity. The perforations 112 are configured to receive cement compound (see for example FIG. 5D), the cement compound bonding the platform 102 against a sheetrock surface, together with smoothening and concealing the platform 102 relative to the sheetrock surface.

Referring specifically to FIG. 2, on the exposed side 106 of the platform 102 is a collar 114 housed within the central aperture 110, and affixed to the exposed side 106 of the platform by four pins 116. The collar 114 has a radial lip 118 encircling the central aperture 110. Towards an interior 120 of the collar 114, that is in the direction from the exposed side 106 towards the sheetrock side 104 of the platform 102, the radial lip 118 steps down to an interior radial boss 122, clarified in FIG. 1. Together, the radial lip 118 and interior radial boss 122 serve as a snap connection point for a recessed luminaire. Further inwards in the interior 120 towards the sheetrock side 104 of the platform 102, the collar 114 smoothens along an axial tubing 124. It should be noted that the radial lip 118, interior radial boss 122, and axial tubing 124 can be integrally formed.

Referring back to FIG. 1, on the sheetrock side 104 of the platform 102, the axial tubing 124 of the collar 114 terminates. Disposed radially outward from the axial tubing 124, that is, in the direction of the perimeter 108 of the platform 102 from the central aperture 110, is a podium 126, disposed relatively concentric around the axial tubing 124.

The podium 126 receives the four pins 116 extending from the exposed side 106 to the sheetrock side 104 of the platform 102, effectively affixing the radial lip 118, interior radial boss 122, and axial tubing 124 to the platform 102. Further to this point, the podium 126 has a diameter $d_1$ which is greater than a diameter $d_2$ of the central aperture 110 such that the platform 102 serves as a stop from the podium 126 entering the central aperture 110. In this regard, the radial lip 118, interior radial boss 122, and axial tubing 124 can be assembled to the podium 126 via the four pins 116 through the platform 102, locking the collar 114 in place in the central aperture 110.

Figure 3:
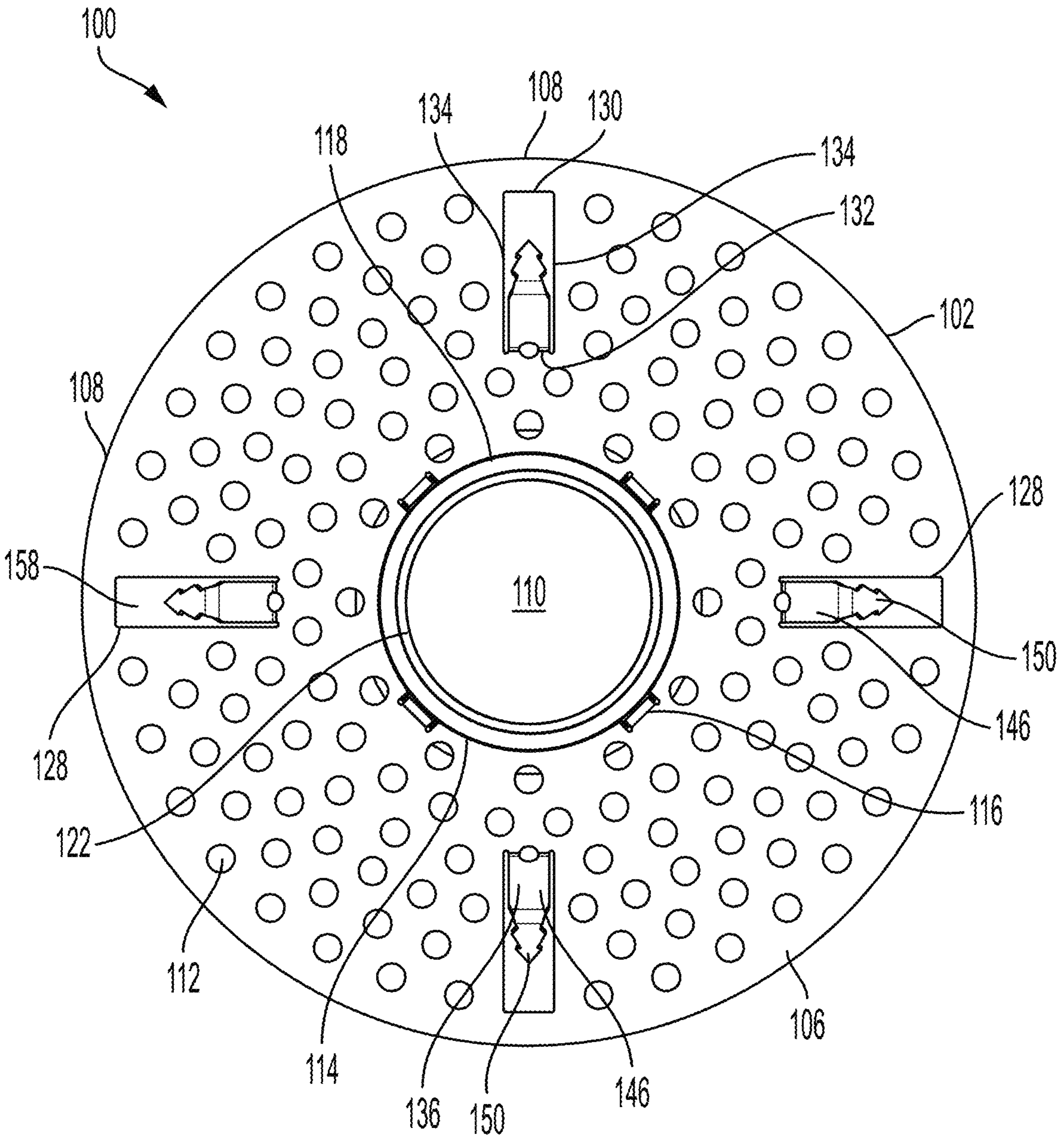
FIG. 3 is a plan view of the exposed side of the frame assembly.
Figure 4:
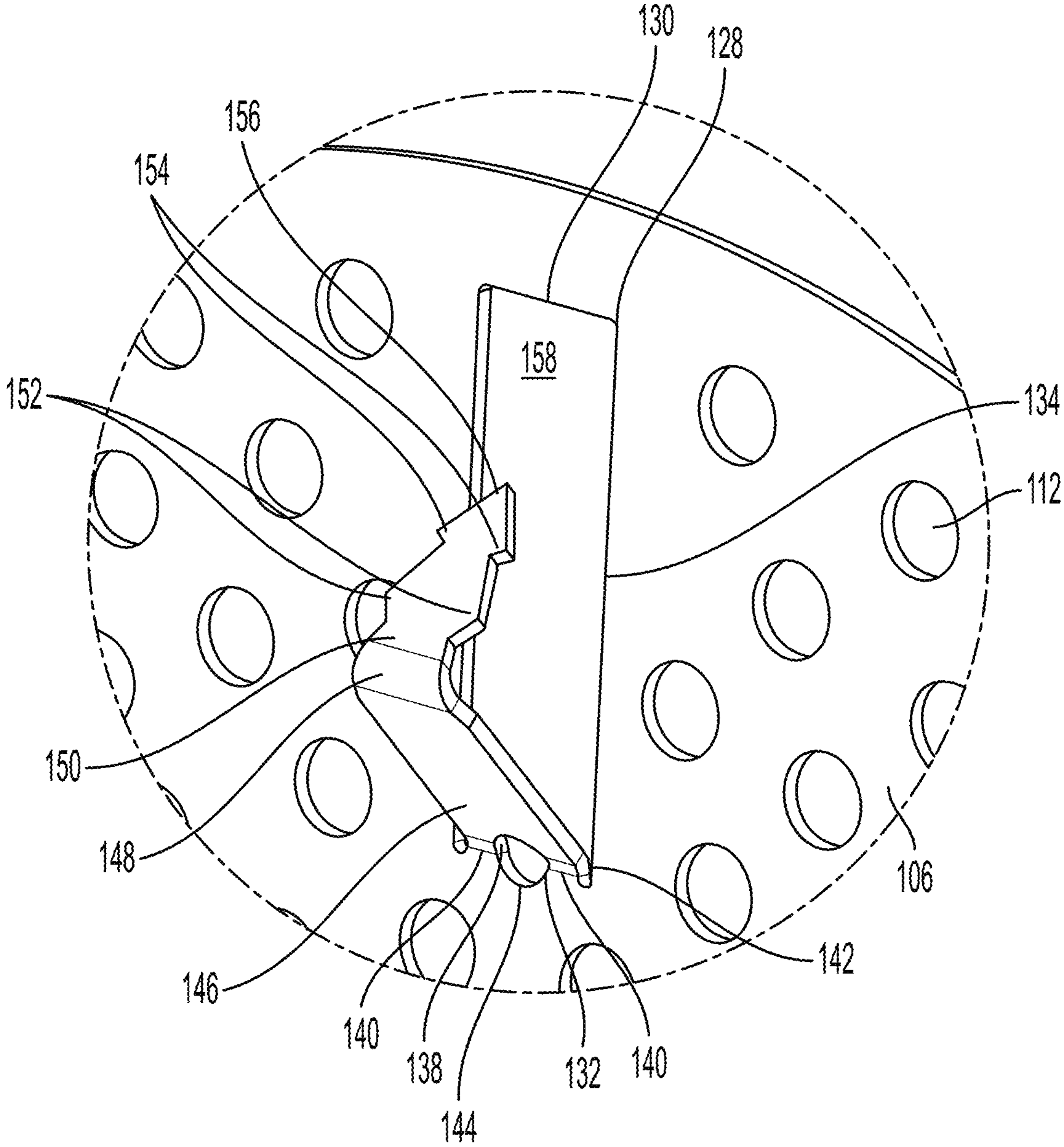
FIG. 4 is an enlarged, cutaway, perspective view of FIG. 2, exhibiting details of barbs of the frame assembly.
Figure 5:
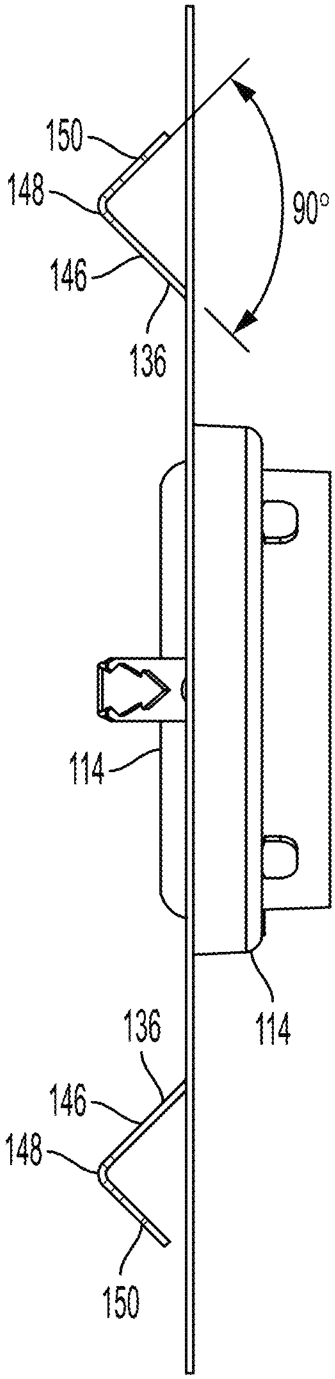
FIG. 5 is a side plan view of the frame assembly for a recessed luminaire.
Figure 6A:
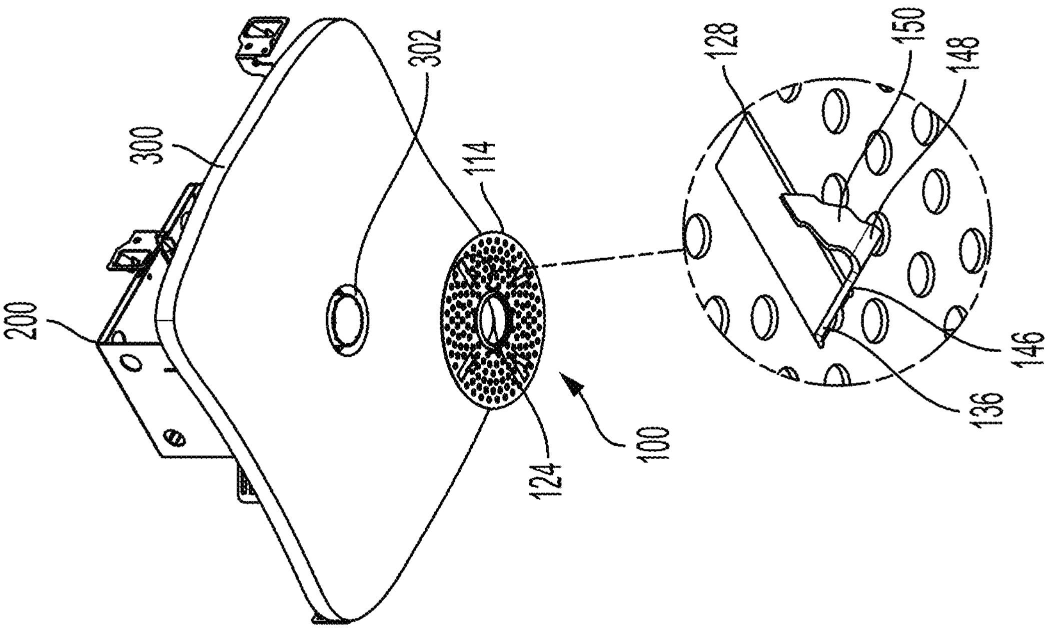
FIGS. 6A-6D are perspective views of the frame assembly during installation.
Figure 6B:
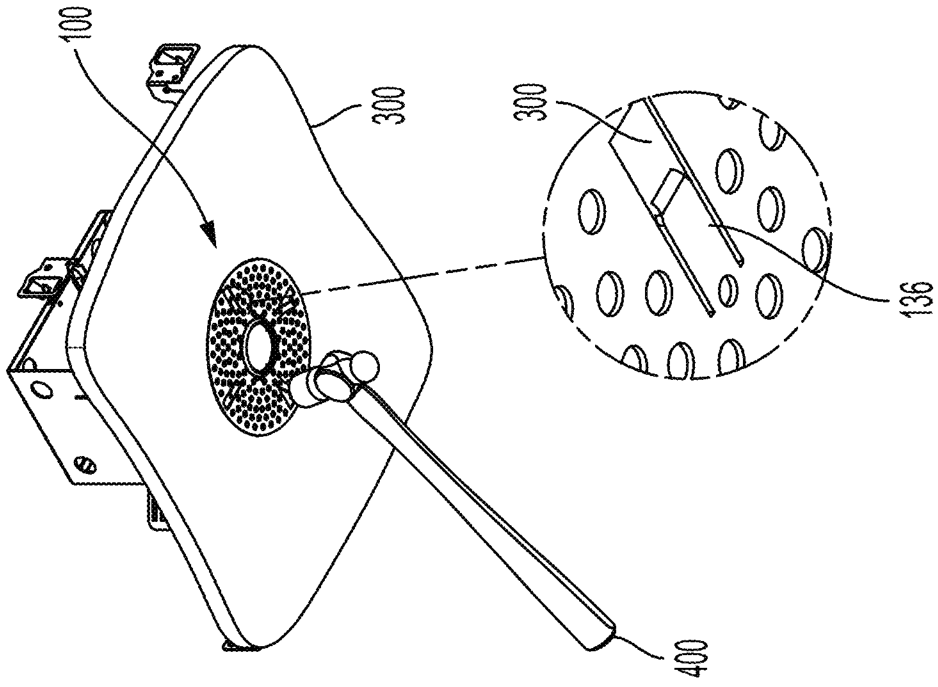
Figure 6C:
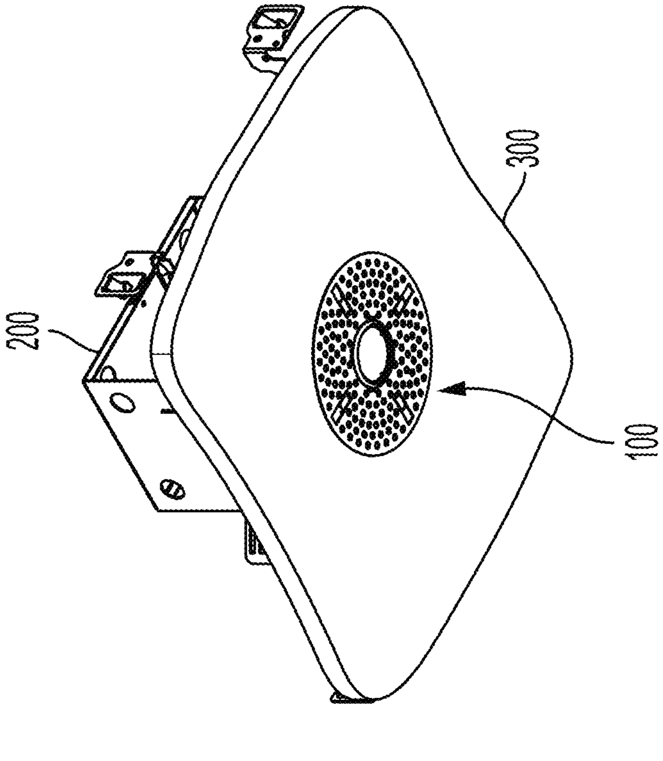
Figure 6D:
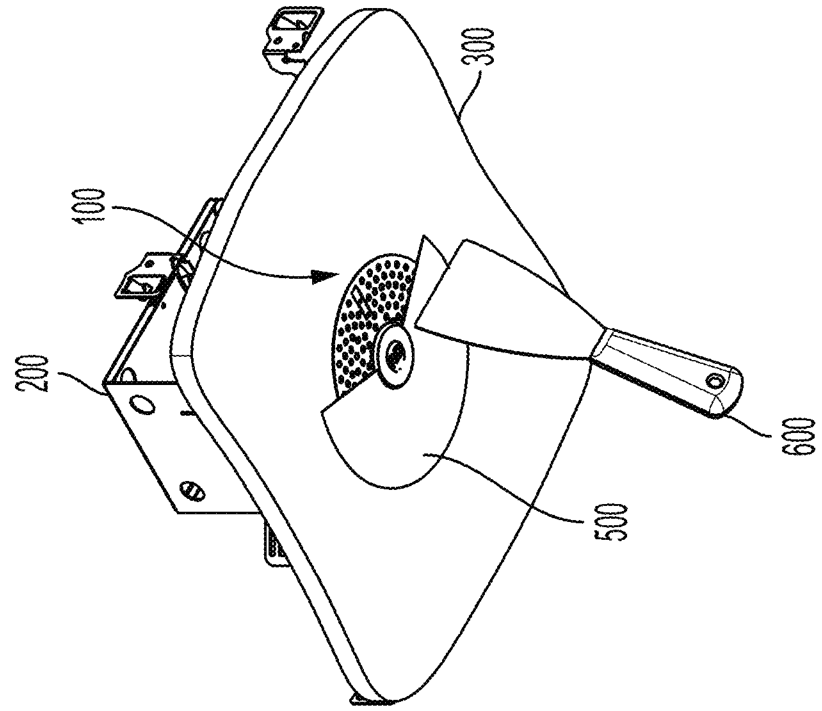

Referring now to FIGS. 3-5 together, the platform 102 further defines four oblong slots 128 extending between the sheetrock side 104 and the exposed side 106. Each oblong slot 128 is angularly distanced away from an adjacent oblong slot 128 by 90 degrees. For example, where the platform 102 represents a face of a clock, the four oblong slots 128 are disposed at the 12:00, 3:00, 6:00, and 9:00 o'clock positions. However, one having ordinary skill in the art will appreciate that the shape, quantity, and position of the slots 128 can vary from application to application.

Each oblong slot 128 extends between a distal edge 130, positioned near to the perimeter 108 of the platform 102, and a proximate edge 132, positioned near to the central aperture 110 of the platform 102. Each oblong slot 128 is rectangular in shape, with the distal edges 130 and proximate edges 132 serving as the short side thereof. Connecting the distal edges 130 and the proximate edges 132 are radial edges 134, each of which having a greater length than the distal edges 130 and the proximate edges 132.

Attached or integrally formed with each proximate edge 132 of each oblong slot 128 is a barb 136. Referring specifically to FIG. 4, the barb 136 is attached or integrally formed with each proximate edge 132 of each oblong slot 128 by an anchor end 138, specifically two anchor flanges 140. The anchor flanges 140 are spaced from the radial edges 134 of the oblong slot 128 by a barb slot 142, and further spaced from each other by an anchor perforation 144.

The anchor flanges 140 are bent relative to the platform 102. Relative to exposed side 106 of the platform 102, the anchor flanges 140 prolong at an approximate 45 degree angle away from the exposed 106 and the sheetrock side 104.

The anchor flanges 140 extend from the proximate edge 132 of each oblong slot 128 towards the distal edge 130, and join at a barb base 146. The barb base 146 still extends from the proximate edge 132 of each oblong slot 128 towards the distal edge 130, and due to the barb slot 142, is spaced away from the radial edges 134 of the oblong slot 128 to prevent friction therebetween and promote maneuverability. Further, in some embodiments, the barb base 146 may slightly taper inwards within each oblong slot 128. Nonetheless, the barb base 146 maintains the 45 degree angular displacement away from the exposed side 106 of the platform 102.

Each barb base 146 eventually transitions to an intermediate barb region 148 which in fact does taper inwards within each oblong slot 128. The intermediate barb region 148 joins the barb base 146 to a barbed shank region 150. The intermediate barb region 148 is bent and displaces the barb base 146 from the barbed shank region 150 by approximately 90 degrees. In this regard, the barbed shank region 150 is angled back towards to exposed side 106 and sheetrock side 104 of the platform at roughly a 45 degree angle. The barbed shank region maintains the 45 degree angular displacement toward the exposed side 106 of the platform 102 as it prolongs. The angle of the barb 136 is particularly illustrated in FIG. 5.

Each barb shank region 150 of each barb 136 defines a pair of proximate outwardly jutting teeth 152, followed by a pair of distal outwardly jutting teeth 154, the barb shank region 150 terminating in a point 156. By nature of the barb shank region 150 being pointed, the region 150 generally tapers from the intermediate barb region 148, to the proximate outwardly jutting teeth 152, further to the distal outwardly jutting teeth 154, and point 156.

Based on the aforementioned design of the barb 136, each is disposed within the respective oblong slot 128 with extra room, referred to herein as a blank area 158. As such, the oblong slots 128 may further serve a similar purpose as the perforations 112, configured to receive cement compound, the cement compound bonding the platform 102 against a sheetrock surface, together with smoothening and concealing the platform 102 relative to the sheetrock surface.

Referring now to FIGS. 6A-7B, perspective views of the frame assembly 100 are shown during installation to a recessed luminaire 200 disposed behind a layer of sheetrock 300. The frame assembly 100 is positioned with the axial tubing 124 of the collar 114 inserted into a hole 302 of the sheetrock 300. In embodiments without a collar 114, the frame assembly 100 is positioned with the central aperture 110 overlapping the hole 302 of the sheetrock.

Figure 7A:
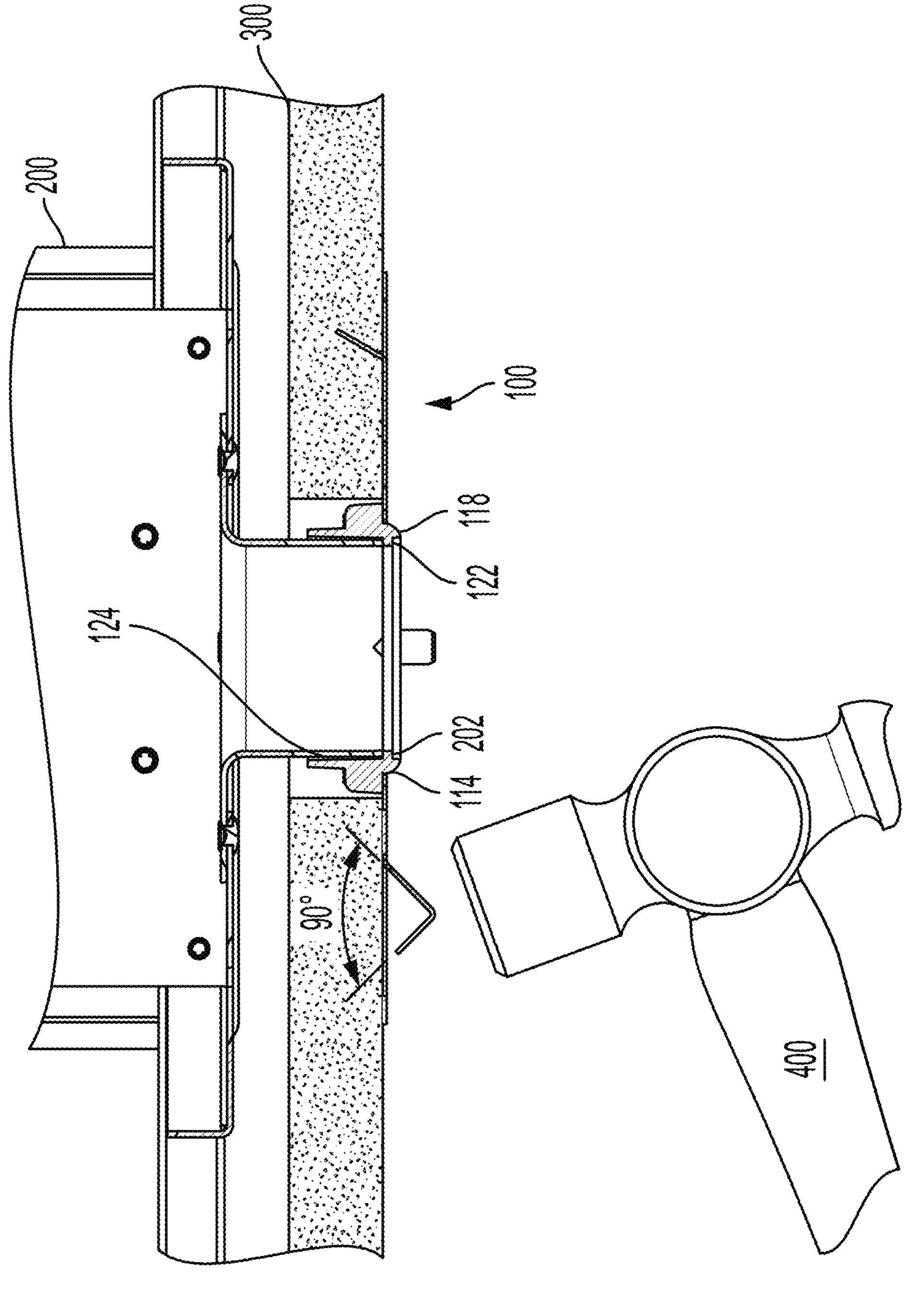
FIGS. 7A-7B are cross-sectional views of the frame assembly during and after the installation process.

Thereafter, the barb base 146, intermediate barb region 148, and/or the barbed shank region 150 of the barb 136 is hammered 400 into the sheetrock 300, as best shown in FIG. 7A. Because the intermediate barb region 148 is bent and displaces the barb base 146 from the barbed shank region 150 by approximately 90 degrees, and because the barbed shank region 150 is angled back towards the exposed side 106 and sheetrock side 104 of the platform at roughly a 45 degree angle, the proximate and distal outwardly jutting teeth 152, 154, together with the point 156 of the barb 136 can be driven by the force of the hammer 400 to cut into the sheetrock 300. And further, the proximate and distal outwardly jutting teeth 152, 154 hold the frame assembly 100 against the sheetrock 300, serving as anchors and engaging points of contacts within the sheetrock 300 and preventing removal therefrom.

Once the frame assembly 100 is anchored against the sheetrock 300 by the barbs 136, construction compound 500 can be applied to the frame assembly 100 using a plastering trowel 600. The construction compound 500 further bonds the frame assembly 100 against the sheetrock 300, together with smoothening and concealing the frame assembly 100 relative to the sheetrock 300.

Figure 7B:
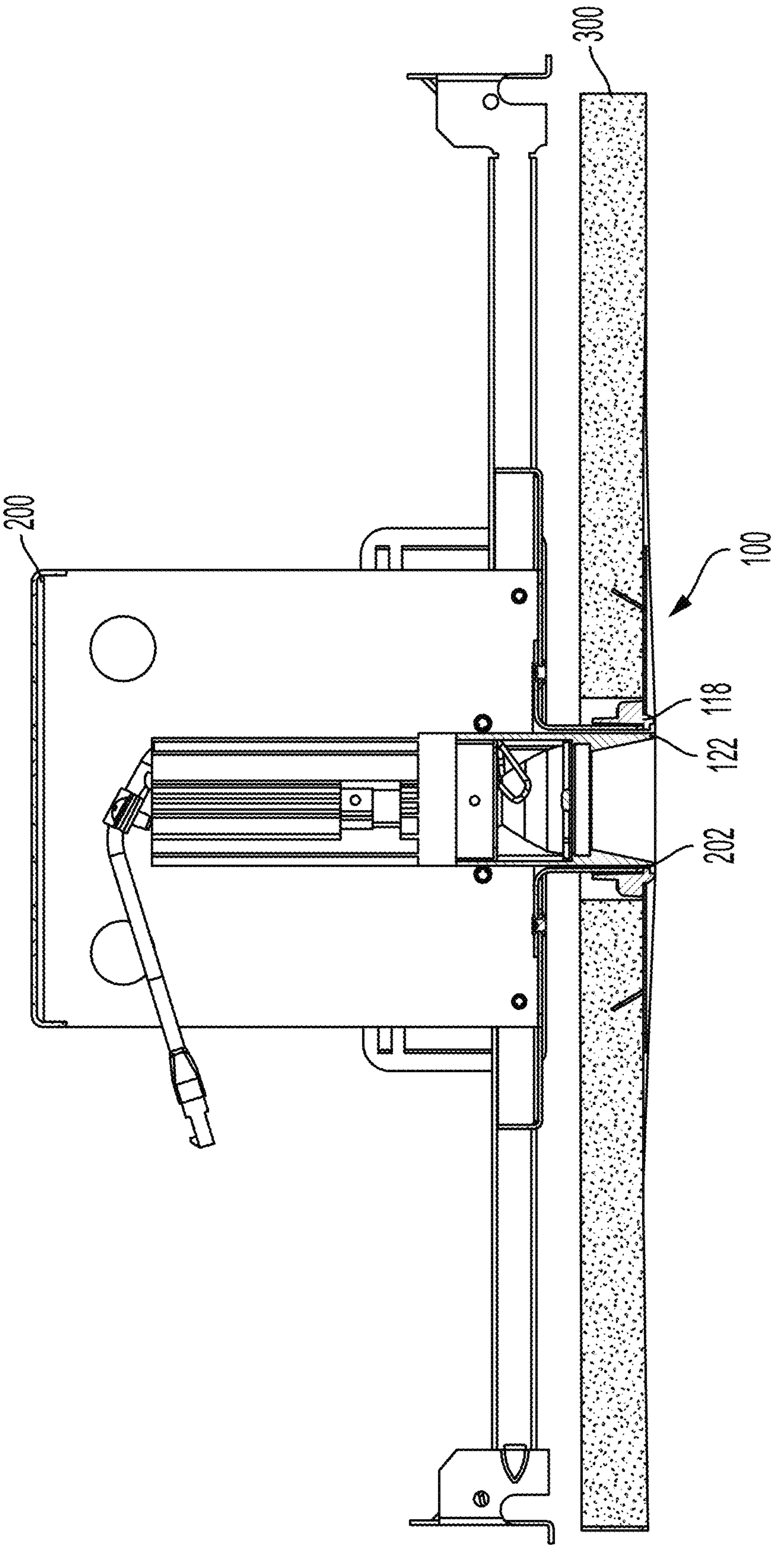

Referring specifically to FIGS. 7A-7B, the collar 114 of the frame assembly 100 is shown in cross-section. As mentioned prior, the radial lip 118 and interior radial boss 122 of the collar 114 serve as a snap-in connection point for the recessed luminaire 200. Thus, to install in some embodiments, the frame assembly 100 is positioned with the axial tubing 124 of the collar 114 inserted into a hole 302 of the sheetrock 300. The recessed luminaire 200 is fed through the axial tubing 124 and a flange 202 of the recessed luminaire 200 bypasses the interior radial boss 122. Either the interior radial boss 122 and/or the flange 202 deflects, and thereafter, the interior radial boss 122 and the flange 202 snap together. Thereafter, the steps described with reference to FIGS. 6A-6D can thereafter be performed.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A frame assembly for a recessed luminaire comprising:
a planar platform having a sheetrock side and an exposed side opposing the sheet rock side, the planar platform defining:
a central aperture; and
a plurality of perforations disposed around the central aperture, the perforations configured for receipt of construction compound;
an aperture collar configured for disposal within the central aperture of planar platform, the aperture collar configured to connect to the recessed luminaire; and
at least two barbs configured for bending out of a plane of the platform for insertion into sheetrock, each barb having:
a barb base extending away from the exposed side of the planar platform at an angle of approximately 45 degrees, and
a barbed shank region extending towards the sheet rock side at an angle of approximately 90 degrees with respect to the barb base so that the barbed shank region is configured to be secured into sheetrock when the sheetrock side of the platform is against sheetrock.

2. The frame assembly of claim 1, wherein the aperture collar includes a radial lip configured for encircling the central aperture, the radial lip stepping down to an interior radial boss, the radial lip and interior radial boss serving as a snap connection point for the recessed luminaire.

3. The frame assembly of claim 2, wherein the aperture collar further includes an axial tubing for insertion into sheetrock housing the recessed luminaire.

4. The frame assembly of claim 3, wherein the aperture collar further includes a podium disposed radially outward from the axial tubing, the podium configured to receive a pin extending from the exposed side to the sheetrock side of the platform, affixing the radial lip, interior radial boss, and axial tubing to the platform.

5. The frame assembly of claim 1, wherein the platform further defines at least two oblong slots disposed around the central aperture, each oblong slot extending between a distal edge and a proximate edge, the at least two barbs connected to the proximate edge of a respective oblong slot.

6. The frame assembly of claim 5, wherein each barb further includes anchor flanges configured to bend the barb base away from the exposed side of the planar platform at the 45 degree angle, and an intermediate barb region that the displaces barb base from the barbed shank region by the 90 degrees.

7. The frame assembly of claim 1, wherein each barb defines a pair of proximate outwardly jutting teeth, a pair of distal outwardly jutting teeth, and terminating at a point.

8. A frame assembly for a recessed luminaire comprising:
a planar platform including: sheetrock side; an exposed side opposing the sheet rock side; an aperture collar defining a central aperture; and at least two integrated bent barbs, each integrated barb having: a barb base extending away from the exposed side at an angle of approximately 45 degrees with respect to the planar platform; and a barbed shank region extending from a bend back towards the sheet rock side at an angle of approximately 90 degrees with respect to the barb base so that the barbed shank region is configured to be secured into sheetrock when the sheetrock side is against sheetrock of the platform, the aperture collar extending into a hole in the sheetrock, and the integrated barb is struck with a hammer,
wherein the planar platform defines: a plurality of perforations disposed around the central aperture and an oblong slot around each integrated barb, the perforations and oblong slot being configured to receive construction compound that cements the planar platform against the sheetrock with the at least two integrated barbs.

9. The frame assembly of claim 8, wherein the aperture collar includes a radial lip configured for encircling the central aperture, the radial lip stepping down to an interior radial boss, the radial lip and interior radial boss serving as a connection point for the recessed luminaire.

10. The frame assembly of claim 9, wherein the aperture collar further includes an axial tubing for insertion into sheetrock housing the recessed luminaire.

11. The frame assembly of claim 10, wherein the aperture collar further includes a podium disposed radially outward from the axial tubing, the podium configured to receive a pin extending from the exposed side to the sheetrock side of the platform, affixing the radial lip, interior radial boss, and axial tubing to the platform.

12. The frame assembly of claim 8, wherein the platform further defines at least two oblong slots disposed around the central aperture, each oblong slot extending between a distal edge and a proximate edge, the at least two integrated barbs connected to the proximate edge of a respective oblong slot.

13. The frame assembly of claim 12, wherein each integrated barb further includes anchor flanges configured to bend the barb base away from the exposed side of the planar platform at the 45 degree angle, and an intermediate barb region that displaces the barb base from the barbed shank region by the 90 degrees.

14. The frame assembly of claim 8, wherein each integrated barb defines a pair of proximate outwardly jutting teeth, a pair of distal outwardly jutting teeth, and terminating at a point.

15. A frame assembly for a recessed luminaire comprising:
a planar platform having a sheetrock side and an exposed side opposing the sheet rock side, the planar platform defining:
a central aperture configured for receiving the recessed luminaire; and
a plurality of perforations disposed around the central aperture, the perforations configured for receipt of construction compound;
at least two barbs configured for bending out of a plane of the platform for insertion into sheetrock, each barb having:
a barb base extending away from the exposed side of the planar platform at an angle of approximately 45 degrees, and
a barbed shank region extending towards the sheet rock side at an angle of approximately 90 degrees with respect to the barb base so that the barbed shank region is configured to be secured into sheetrock when the sheetrock side of the platform is against sheetrock.

16. The frame assembly of claim 15, wherein the platform further defines at least two oblong slots disposed around the central aperture, each oblong slot extending between a distal edge and a proximate edge, the at least two barbs connected to the proximate edge of a respective oblong slot.

17. The frame assembly of claim 16, wherein each barb further includes anchor flanges configured to bend the barb base away from the exposed side of the planar platform at the 45 degree angle, and an intermediate barb region that displaces the barb base from the barbed shank region by the 90 degrees.

18. The frame assembly of claim 15, wherein each barb defines a pair of proximate outwardly jutting teeth, a pair of distal outwardly jutting teeth, and terminating at a point.

* * * * *